Nov. 9, 1948.   J. J. ROOT   2,453,386
REMOTE CONTROL SYSTEM

Filed July 25, 1945   2 Sheets-Sheet 1

INVENTOR.
John J. Root
BY
S. Stephen Baker
ATTORNEY

Nov. 9, 1948.  J. J. ROOT  2,453,386
REMOTE CONTROL SYSTEM
Filed July 25, 1945  2 Sheets-Sheet 2

John J. Root INVENTOR.
BY S. Stephen Baker
ATTORNEY

Patented Nov. 9, 1948

2,453,386

UNITED STATES PATENT OFFICE 2,453,386

REMOTE CONTROL SYSTEM

John J. Root, New York, N. Y.

Application July 25, 1945, Serial No. 606,893

9 Claims. (Cl. 318—24)

This invention relates to electrical remote control systems and more particularly to an apparatus for transmitting mechanical motion, electrically, from one place to another.

Instruments for reproducing angular movements at a remote point are well known, extensive use of such instruments being made in modern aircraft where the indications of many meters widely dispersed in the ship are centralized in the instrument board. Some of the common uses thereof include indications of engine oil pressure, temperature, manifold pressure, barometric or altimeter readings, positioning of landing gears, etc. It is a further function of modifications of such instruments to make the position of a motor and its load correspond with the position of a controlling element.

Systems of this type consist essentially of a transmitting unit located near the source of measurement and a receiving or indicating unit which includes a position establishing pointer operating in synchronism with the transmitter control. In another embodiment of the system, the receiver takes the form of a control transformer which is applied to the input terminals of an amplifier, the output of which is fed to a servo system. Means are controlled by the servo system for causing movement corresponding to the output voltage of the control transformer. Such corresponding movement includes means for cancelling the output voltage of the control transformer so that the establishment of the correct position is accompanied by a neutralization of the voltage which causes the movement.

A fundamental requirement for systems of this nature is the faithful reproduction of the transmitter movements. This involves, among other things, the generation of sufficient torque in the receiver unit to overcome its own inertia in moving to the correct angular position. It is obvious that the realization of this objective is not limited to increasing the torque but similar results can be achieved by decreasing the inertia of the system. This decrease of inertia is likewise a valuable characteristic in the construction of the transmitter unit since it increases the sensitivity of the controlling source. Inasmuch as the power available from some of the sensitive indicating devices mentioned above is extremely small, the utility of a system having low inertia is apparent.

Instruments of the above type generally comprise a stator in the form of a cylindrical, slotted, laminated magnetic structure having a distributed three phase winding wound thereon. Excitation of the stator winding is usually single phase and is effected by means of a rotor the orientation of which produces unique voltages across the three legs of the stator. The voltages are unique in that the three voltage values correspond to particular position of the rotor so that the stator voltages constitute an electrical indication of the rotor position. Coupling between the rotor and stator is usually effected by a coil wound on the rotor, this rotor winding being excited through slip rings or variants thereof although prior patented devices have eliminated this necessity by the use of permanent magnets which contributed their own fields in exciting the stator windings.

Bearing the foregoing in mind, an object of the present invention is to provide a remote indicating system of the type hereinabove described which shall have a high degree of sensitivity and torque.

Another object of this invention is to provide such a device having a marked decrease in physical dimensions as compared to conventional devices so that the system can be employed where scarcity of operating space would otherwise present a formidable problem.

Another, and most important object of this invention, is to provide such a device wherein external excitation of alternating current form may be applied to the rotor without requiring a rotor winding. Many advantages accrue from such an arrangement. For example, slip rings, brushes or the like are unnecessary since there is no winding on the movable rotor requiring the application of an exciting voltage. This expedient also serves to reduce the weight and size of the rotor to a degree where its inertia is considerably minimized and its sensitivity correspondingly increased. The lightness of the rotor further permits the use of very delicate rotor bearings. This invention has as its object, moreover, the realization of these advantages without the sacrifice of torque to which prior devices aiming at the same objective have been subject. Thus, it is an object to retain a primary, exciting winding but to disassociate it physically from the rotor so that the rotor is enabled to function somewhat as a movable link between two stationary windings representing the rotor and stator windings. It is possible, moreover, to increase the size or ampere-turns of the exciting, rotor winding to any desired degree since the rotor does not have the burden of supporting it.

Another object of this invention is to provide a device of the character above described which will be inherently self shielding so that ambient magnetic fields external to the device will have little, if any, effect on its operation.

Another object of this invention is to provide a device of this character which shall have considerable manufacturing advantages such as simplified component construction and ease of assembly.

Other objects of this invention will be apparent from the following description it being understood that the above general statements of the objects of my invention are intended to describe and not to limit it in any manner.

Figure 1:
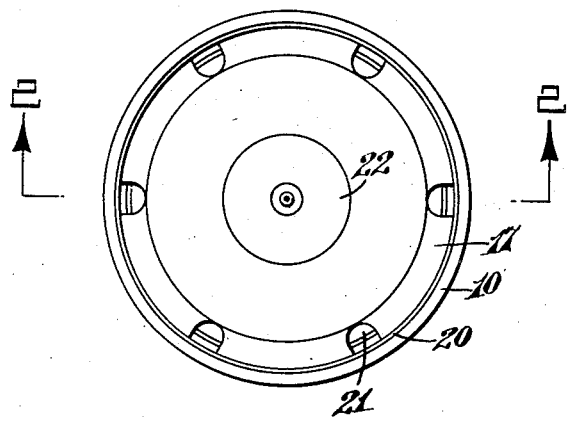
Fig. 1 is a top plan view of a practical embodiment of the invention.

In the embodiment illustrated, both the transmitting and indicating motor elements are practically identical, although their respective housings may vary in order to adapt the devices to their environment. The device includes a cylindrical casing 10 of magnetic material which not only encloses the component elements but serves as a part of the electro-magnetic circuit as will hereinafter appear. Disposed centrally of the casing 10 is the cylindrical soft iron core 11 of the three-phase stator. The iron core 11 is laminated and is formed with circumferentially spaced slots along its inner periphery. Winding 12 represents one phase of the distributed three phase winding consisting of the windings 12, 13 and 14, wound in the slots of core 11. The construction of the stator illustrated herein is identical with that illustrated and described in U. S. Patent No. 2,038,059 of April 21, 1936. Cylindrical spacers 8 and 9 which may be of plastic material serve to center the iron core 11 in the casing 10.

The rotor winding is illustrated as being formed of two windings 15 and 16 connected in series. The windings 15 and 16 comprise annular, horizontally wound coils each disposed on and supported by opposite sides of the core 11. As one example of a satisfactory embodiment where a rather small instrument was desired, each winding was formed with 1000 turns of No. 34 wire and was approximately 1½" in diameter. These rotor windings were energized by 24 volts at 400 cycles. The term "rotor winding" is used because the winding takes the place of conventional rotor windings although in the instant invention it is physically disassociated from the rotor and does not rotate therewith.

Cover members 17 and 18 are of magnetic material and serve to enclose the windings although they also constitute paths for the magnetic circuits as will hereinafter appear. Cover members 17 and 18 may be secured to the casing 10 by resting on shoulders 19 formed on the casing wall and a circular ring 20 of spring stock may serve to retain the cover members in place. Openings 21 are formed in the cover members so that lead wires may be brought out of the casing 10.

Plug members 22 and 23 serve as bearing holders for rotor shaft bearings 24 and 25 although it is apparent that the cover members and plug members may be integral if desired.

The rotor assembly includes a non-magnetic drum 26 having a central web 27 which furnishes a central support for the rotor shaft. Maintained on the drum 26, as by a press fit, are the rotor elements 28 and 29 each of which function as magnetic links in the operation of the instrument. Rotor shaft 30 is rigidly maintained by the web 27 and a circular stop member 31 may be provided to help maintain the shaft 30 against longitudinal displacement.

Figure 3:
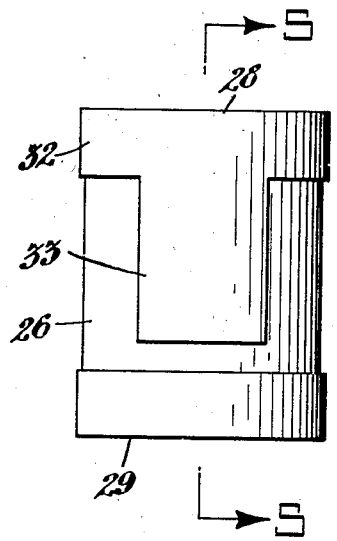
Fig. 3 is an enlarged elevational view of the rotor utilized in the device.
Figure 4:
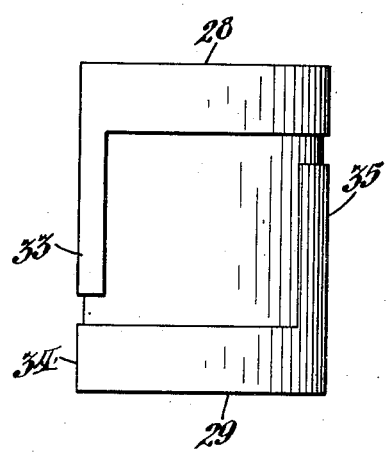
Fig. 4 is a view similar to Fig. 3 with the rotor turned approximately 90 degrees from its position in Fig. 3.
Figure 5:
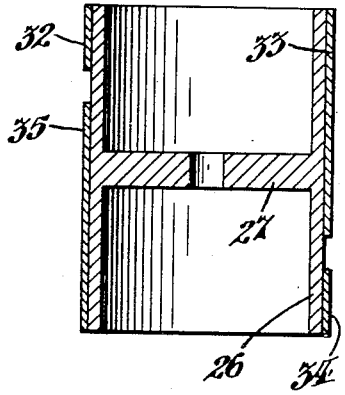
Fig. 5 is a cross-section along the line 5—5 of Fig. 3.

The rotor is illustrated separately in Figs. 3 and 4 and 5. The magnetic rotor element 28 comprises a ring 32 having a depending arm 33. The rotor element 29 similarly comprises a ring 34 having a depending arm 35. The respective arms 33 and 35 are 180 degrees apart around the periphery of the rotor drum 26. As illustrated herein, each arm occupies about 70 degrees of the periphery of the drum 26, the arms being laterally and angularly spaced on the drum 26. Each rotor element is elongated in that the depending arms project or extend toward the center or mid-point of the cylindrical rotor and the axis of elongation of each rotor element is therefore parallel to the axis of the cylinder. The depending arms 33 and 35 further extend slightly past such mid-point or about ¾ of the length of the rotor and their respective inner poles or terminals are on opposite sides of such mid-point.

The operation of the instrument is as follows, reference being made to the components hereinabove described and to the schematic circuit of Fig. 6.

Figure 2:
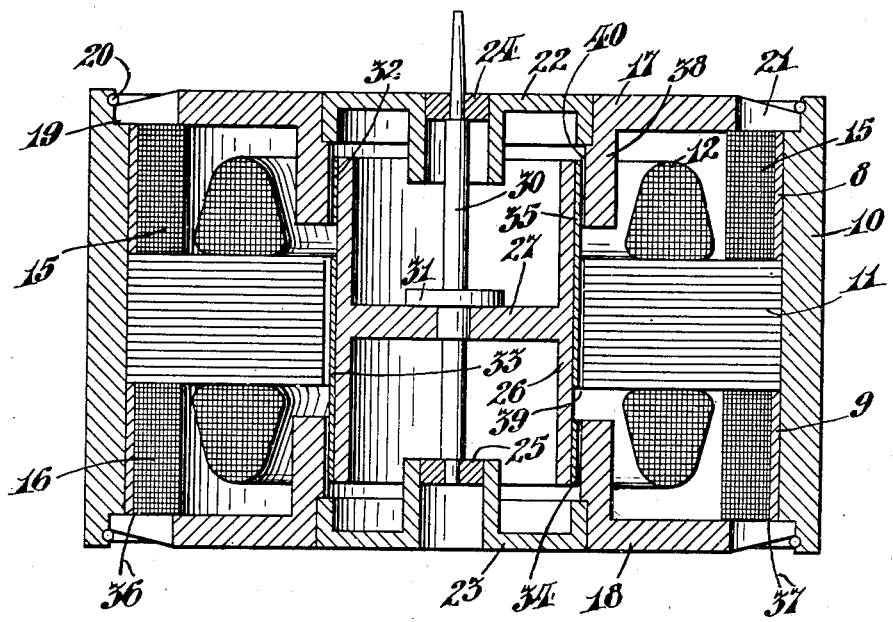
Fig. 2 is an enlarged cross-section along the line 2—2 of Fig. 1.

Single phase excitation is applied to the rotor windings 15 and 16 from the A. C. supply lines 36 and 37. Referring to Fig. 2 and noting the radial position of the rotor, the flux produced by the alternating current flowing in the rotor winding 15 will travel from the center of the winding out at the upper end, around the outside of the coil and back into the other end. It will be observed that winding 15 shares the low reluctance core path with the stator winding and that the flux path outlined is provided with magnetic material substantially throughout its course at that point only where the depending arm 33 lies adjacent the core 11 as governed by the radial position of the rotor. Thus, the flux will flow from the inside of the winding 15, to the depending flange 38 of the cover member 17, from the cover member 17 to the casing 10, from the casing 10 to the laminated core 11, thence to the depending arm 33 of the rotor through the short air gap 39, thence from the ring 32, across the short air gap 40, back to the depending flange 38. Since the air gaps as shown in the embodiment herein are approximately .0005 inch, the field is intense through the magnetic path outlined.

The alternating flux in that portion of the core 11 which forms part of the magnetic path outlined will induce a voltage in the leg of the three-phase stator winding that lies in the said path. As hereinafter described different voltages will be induced in each of the three phases of the stator winding, the relative value of each depending on the position of the rotor. As the rotor element is revolved to another position around the inner periphery of the stator the voltage induced in the said leg or phase will diminish while that in an adjoining phase will increase. Thus, every position of the rotor produces a new set of values which is characteristic of its position. It will be noted that as the rotor is rotated, the abovementioned high flux intensity path will accompany its rotation because the radial position of the depending arm 33 forms part of that path while the remaining components of the path are concentric and stationary.

The air gap 39 between the core 11 and depending arm 33 produces opposite magnetic poles on the said core and depending arm. Thus, at any one time, the edge of the core 11 may be north, the depending arm 33 south, and the ring 32, north. As will hereinafter appear, the depending arm 35 of the rotor element 29 will represent a north pole at the same time that the depending arm 33 represents a south pole so that the conditions of a conventional salient pole or "dumbbell" rotor are met without requiring an accompanying winding.

The rotor windings 15 and 16 are connected in series and direction of the current is such as to form opposite poles on the top and bottom of both windings respectively. Accordingly, the adjacent sides of the windings will likewise be oppositely polarized. Since each rotor element 28, 29 is arranged to co-act with the respective rotor windings, it follows that each rotor element will be oppositely polarized in respect to one another. Thus, assuming that at any one time the ring 32 is north, its depending arm 33 is south. At this time the ring 34 of the other rotor element would be south so that its depending arm 35 is north. It can be seen, therefore, that the electromagnetic arrangement is such that the depending arms 33 and 35 always form opposite poles. In conventional remote indicating systems of the general nature described, the most common type of rotor is the salient pole type, the accompanying winding of which is single-phase excited through two slip rings so that opposite poles are accordingly formed on its respective ends. In the instant rotor arrangement, the same conditions of polarity are achieved without requiring an accompanying rotor winding.

The flux path of the winding 16 is controlled in the same manner as is the flux path of the winding 15 above described so that the position of the rotor and the depending arm 35 determine the relative voltage values induced in the three phases of the stator windings in cooperation with the other rotor element. It should also be observed that leakage flux entering the core 11 through paths other than the respective depending arms 33 and 35 is neutralized or cancelled due to the symmetrical arrangement of the components on either side of the stator. In addition, the rotor elements 28 and 29 are formed with the respective rings 32 and 34 of radial symmetry in order to avoid the action of unbalanced magneto-motive or torque forces on the rotor elements which might cause the rotor to vibrate in its bearings.

Figure 6:
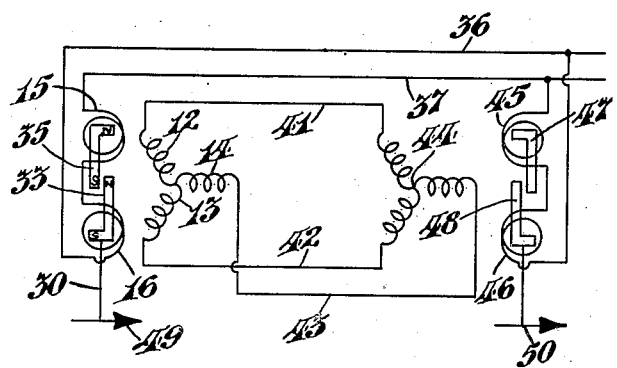
Fig. 6 is a schematic view illustrating electrical motion transmission system to which the present invention has been applied.

Referring to Fig. 6, which schematically illustrates a system of the character described, the single phase excitation applied to the rotor in the manner described above, produces a single phase oscillating field in the stator windings 12, 13 and 14, the relative magnitudes of the voltages induced in the phases being dependent upon the orientation of the rotor.

The stator windings are connected by leads 41, 42 and 43 to a similar three phase stator jointly designated by the numeral 44, located at the remote point where the mechanical motion is to be reproduced. The stator 44 is included in an apparatus which may be called a receiver and is a counterpart of the apparatus above described which may be called a transmitter. The receiver comprises a pair of rotor windings 45 and 46 and rotor elements 47 and 48 which duplicate in construction and disposition the corresponding components of the transmitter.

Rotation of the transmitter pointer 49, either manually or by an instrument responding to a particular condition, will actuate the transmitter rotor so as to induce voltages as abovementioned in the transmitter stator and disturb the balanced relationship of the respective stators. Single phase currents will then flow in the lines 41, 42 and 43 and will excite the windings of stator 44 so as to produce a flux having the same phase and direction in space as that produced by the transmitter rotor. This flux will excite the receiver rotor windings 45 and 46 so as to exert a torque on the receiver rotor causing it to rotate the pointer 50 to a position where the balance of the system is restored, that is, to a position of coincidence with the transmitter rotor.

It can be seen from the foregoing that a disassociation of the rotor winding from the rotor has been effected. Not only are slip rings or brushes thereby rendered unnecessary but the weight of the rotor may be decreased materially and delicate jewel bearings may be employed for its shaft. The device is furthermore inherently shielded so that installation problems which have been of considerable magnitude in prior devices due to sensitivity of those devices to ambient, external magnetic fields, are simplified.

The invention may also be applied to systems in which the receiver is supplanted by a control transformer. This may be accomplished by increasing the radial width of the depending arm of the rotor in the receiver to an extent where its symmetry will prevent the application of torque thereto but, on the other hand, will produce a voltage across the receiver rotor windings, or control transformer as it may be called. The value of this voltage will depend on the relative position of the receiver rotor and the direction of the field as controlled by the transmitter rotor. This voltage may then be utilized in a known manner to control a motor and to restore the balance of the system.

I have shown a preferred embodiment of my invention but it is obvious that numerous changes and omissions may be made without departing from its spirit. For example, a suitable polyphase winding other than three-phase may be employed in the stators. In addition, the depending arm of the rotors may be more or less than the 70 degrees mentioned. It may further be noted that the depending arms need not be rectangular in shape but that they may be rounded or diamond-shaped in order to avoid abrupt electromagnetic relations with the stators. It may also be pointed out that it is feasible to design the rotor of magnetic material throughout and to emboss the active rotor elements thereon whereupon the increased air gap between the stator and the unembossed or depressed portions will render those portions relatively inactive so as to accomplish the function of the non-magnetic drum 26.

I claim:

1. An electromagnetic transmitting instrument for use in remote control systems comprising a stationary primary winding, a stationary polyphase secondary winding of substantially annular form, and a cylindrical rotor for defining two paths of high magnetic permeability for alternating flux generated by said primary winding, said paths serving to induce voltages in portions of said secondary winding through transformer action so that voltages of varying relative magnitudes are induced in the respective phases thereof, said rotor being movable so as to vary said paths accordingly, and a pair of magnetically separate elements on said rotor adapted to be oppositely phased by the action of said generated alternating flux, said separate elements serving to guide said paths to said portions of said polyphase winding, said elements having both their poles or terminals directly adjacent said rotor, one pole of each of said elements being disposed at respectively opposite ends of the rotor and the other pole of each being disposed approximately centrally of the rotor.

2. An electromagnetic transmitting instrument for use in remote control systems comprising a pair of stationary primary windings, a stationary, polyphase, secondary winding disposed inside of said primary windings, and being common thereto in respect to transformer action therewith, all three of said windings being of annular form and being concentric and a cylindrical rotor arranged for rotating movement within a cylindrical space concentric with said annular windings, a pair of laterally and angularly spaced elements on said rotor each adapted to respectively magnetically couple one of said primary windings to radially spaced areas along the periphery of said secondary winding, said pair of primary windings being electrically connected so as to form opposite magnetic poles at any one time on said spaced rotor elements in respect to alternating flux generated by said primary windings, each of said rotor elements being adapted to co-act with less than one half of the periphery of said secondary winding whereby areas 180 degrees apart on said secondary winding are linked with flux of opposite polarity originating in said primary windings, each of said rotor elements being elongated with the axis of elongation disposed parallel to the axis of the cylindrical rotor, and each rotor element extending from respectively opposite ends of the rotor to approximately ¾ the length thereof.

3. A remote indicating system comprising substantially identical transmitter and receiver instruments, each of said instruments including single phase, stationary rotor windings and polyphase, stationary stator windings, said stator windings being interconnected in a normally balanced relationship so as to transmit voltage variations from the transmitter stator to the receiver stator in response to a changed condition at said transmitter stator which unbalances the system, a cylindrical rotor for each transmitter and receiver, a pair of separated elements of magnetic material on each rotor, each element of said pair adapted to be oppositely polarized by alternating current flowing in the respective stator and rotor windings, means to introduce an alternating current to each of said rotor windings whereby the flux characteristics generated at the transmitter will be reproduced at the receiver stator winding so as to act upon the receiver rotor winding, each of said rotors being rotatable in respect to its associated stator winding so as to vary the angular disposition of said magnetic elements, said action of said reproduced flux characteristics serving to rotate said receiver rotor until the angular disposition of its magnetic elements restores the balance of the system, both said elements having one pole or terminal at respectively opposite ends of the rotor and the other pole or terminal extended inwardly in respect to said rotor so as to be at approximately a mid-point on the periphery of said rotor.

4. A remote indicating system comprising substantially identical transmitter and remote indicator components, each of said components including electrically interconnected, polyphase stator windings, rotor windings electrically connected to a source of alternating current, a cylindrical rotor for each of said components, a pair of arcuate magnetically independent rotor elements disposed on each of said rotors, each of said rotors being rotatable in respect to its associated stator winding whereby each of said rotor elements functions as a transformer core coupling the respective rotor and stator windings, the rotor elements in each of said components being incorporated in mutually opposing magnetic paths whereby diametrically opposite portions of each of said stator windings are linked with alternating flux of opposite polarity, said rotor elements being elongated and being disposed flatly against the periphery of the rotor with their axes of elongation parallel to the longitudinal axis of the rotor, both of said elements having one pole or terminal at respective opposite ends of the rotor and having the other pole or terminal extended inwardly and past the center point of the rotor at respectively opposite sides thereof to a point approximately ¾ down the length of the rotor.

5. An electromagnetic transmitting instrument for use in remote control systems comprising a stationary primary winding, a stationary polyphase secondary winding of substantially annular form, a cylindrical rotor and a pair of separate elongated elements on said rotor for defining two paths of high magnetic permeability for alternating flux generated by said primary winding, said paths serving to induce voltages in portions of said secondary winding through transformer action so that voltages of varying relative magnitudes are induced in the respective phases thereof, said rotor being of non-magnetic material whereby said elements are magnetically separated, said elements extending around part of the periphery of said rotor and defining said two paths by said extending parts respectively, and a ring section integral with each of said elements and surrounding said rotor so as to balance magnetomotive forces on each of said elements, said rotor elements being disposed flatly against the periphery of the rotor with their axes of elongation parallel to the longitudinal axis of the rotor, both of said elements having one pole or terminal at respectively opposite ends of the rotor and having the other pole or terminal extended inwardly and past the center point of the rotor at respectively opposite sides thereof and to a point approximately ¾ down the length of the rotor.

6. An apparatus according to claim 5 wherein said rotor is fabricated of a light weight metal and is cylindrical and hollow, said elements being secured to the outer cylindrical wall thereof in radially spaced relationship.

7. An electromagnetic instrument for use in remote control systems comprising a pair of stationary primary windings, a stationary, polyphase, secondary winding disposed inside of said primary windings and common to both of said primary windings for transformer action therewith, all three of said windings being of annular form and being concentric, a core for said secondary winding and extending radially outwardly thereof in all directions, each of said primary windings being respectively mounted on both sides of said core and on the outward portion thereof relative to said secondary winding whereby said core serves both said primary windings and said secondary winding jointly, and a rotor disposed within a central opening of said core whereby magnetic flux from said primary windings may travel through the outwardly extending portion of said core and thence through the portion of said core supporting said secondary winding so as to reach the rotor, said rotor being arranged for rotation in a path parallel to the annulus jointly formed by said windings so as to magnetically couple said primary windings to said polyphase secondary winding, and magnetically separated elements on said rotor adapted to co-act with radially spaced portions of the periphery of said secondary winding, said elements being differentially phased during the operation of the instrument by the action of alternating magnetic flux generated by said primary windings whereby said spaced portions of said secondary winding are subjected to magnetic flux of differential phase.

8. An apparatus according to claim 7 wherein said rotor is non-magnetic and tubular and has a central portion of said tube adjacent to said core and wherein said elements are magnetic and extend partly around said central portion of said rotor where it is adjacent to said core, and a ring integral with each of said elements, each of the rings being formed entirely around the ends of said rotor so as to balance magnetomotive forces acting upon said elements.

9. An electromagnetic transmitting instrument for use in remote control systems comprising a stationary primary winding, a stationary polyphase secondary winding of substantially annular form, a cylindrical rotor and a pair of separate elongated elements on said rotor for defining two paths of high magnetic permeability for alternating flux generated by said primary winding, said paths serving to induce voltages in portions of said secondary winding through transformer action so that voltages of varying relative magnitudes are induced in the respective phases thereof, said rotor being of non-magnetic material whereby said elements are magnetically separated, said elements extending around part of the periphery of said rotor and defining said two paths by said extending paths respectively, a ring section integral with each of said elements and surrounding the respective ends of said rotor so as to balance magneto-motive forces on each of said elements, said elements being disposed flatly against the periphery of said rotor with their axes of elongation parallel to the axis of the rotor, both of said elements having one pole or terminal at its ring section and having the other pole or terminal extending inwardly and past the center point of the rotor at respectively opposite sides thereof and being spaced from the ring section of the other element.

JOHN J. ROOT.

REFERENCES CITED

The following references are of record in the file of this patent:

UNITED STATES PATENTS

| Number | Name | Date |
|---|---|---|
| 705,482 | Thiermann | July 22, 1902 |
| 1,343,362 | Graham | June 15, 1920 |
| 1,431,627 | Bristol et al. | Oct. 10, 1922 |
| 1,492,913 | Wood | May 6, 1924 |
| 1,706,149 | Ellis | Mar. 19, 1929 |